United States Patent
Tucker et al.

(10) Patent No.: US 7,840,547 B1
(45) Date of Patent: Nov. 23, 2010

(54) METHODS AND SYSTEMS FOR EFFICIENT QUERY REWRITING

(75) Inventors: Paul Tucker, Mountain View, CA (US); Amit Singhal, Palo Alto, CA (US); Eric Jackson, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 403 days.

(21) Appl. No.: 10/812,901

(22) Filed: Mar. 31, 2004

(51) Int. Cl.
  *G06F 7/00* (2006.01)
  *G06F 17/30* (2006.01)
(52) U.S. Cl. .................. 707/706; 707/759; 707/772
(58) Field of Classification Search ............... 707/3, 707/5, 706, 759, 772
  See application file for complete search history.

(56) References Cited

U.S. PATENT DOCUMENTS

| | | | |
|---|---|---|---|
| 6,006,222 A | 12/1999 | Culliss | 707/5 |
| 6,006,225 A * | 12/1999 | Bowman et al. | 707/5 |
| 6,014,665 A | 1/2000 | Culliss | 707/5 |
| 6,078,916 A | 6/2000 | Culliss | 707/5 |
| 6,144,958 A * | 11/2000 | Ortega et al. | 707/5 |
| 6,182,068 B1 | 1/2001 | Culliss | 707/5 |
| 6,185,559 B1 | 2/2001 | Brin et al. | 707/6 |
| 6,285,999 B1 | 9/2001 | Page | 707/5 |
| 6,397,217 B1 * | 5/2002 | Melbin | 1/1 |
| 6,480,836 B1 * | 11/2002 | Colby et al. | 1/1 |
| 6,526,440 B1 | 2/2003 | Bharat | 709/219 |
| 6,529,903 B2 | 3/2003 | Smith et al. | 707/7 |
| 6,564,213 B1 * | 5/2003 | Ortega et al. | 707/5 |
| 6,571,239 B1 * | 5/2003 | Cole et al. | 1/1 |
| 6,615,209 B1 | 9/2003 | Gomes et al. | 707/5 |
| 6,651,054 B1 | 11/2003 | de Judicibus | |
| 6,658,423 B1 | 12/2003 | Pugh et al. | 707/102 |
| 6,678,681 B1 | 1/2004 | Brin | 707/6 |
| 6,725,259 B1 | 4/2004 | Bharat | 709/219 |
| 6,751,611 B2 | 6/2004 | Krupin et al. | |
| 6,754,873 B1 | 6/2004 | Law et al. | 715/501 |
| 6,772,150 B1 * | 8/2004 | Whitman et al. | 707/6 |
| 6,895,406 B2 * | 5/2005 | Fables et al. | 707/102 |
| 6,931,401 B2 * | 8/2005 | Gibson et al. | 707/6 |
| 7,146,416 B1 * | 12/2006 | Yoo et al. | 709/224 |
| 2002/0042791 A1 | 4/2002 | Smith et al. | 707/5 |
| 2002/0111945 A1 * | 8/2002 | Young et al. | 707/9 |
| 2002/0123988 A1 | 9/2002 | Dean et al. | 707/3 |
| 2002/0133481 A1 | 9/2002 | Smith et al. | 707/3 |
| 2002/0147724 A1 * | 10/2002 | Fries et al. | 707/100 |
| 2002/0161752 A1 * | 10/2002 | Hutchison | 707/3 |
| 2002/0169595 A1 * | 11/2002 | Agichtein et al. | 704/9 |
| 2003/0033279 A1 * | 2/2003 | Gibson et al. | 707/1 |
| 2003/0033324 A1 * | 2/2003 | Golding | 707/200 |
| 2003/0050977 A1 | 3/2003 | Puthenkulam et al. | 709/204 |
| 2004/0059708 A1 | 3/2004 | Dean et al. | 707/1 |
| 2004/0119740 A1 | 6/2004 | Chang et al. | 345/751 |

(Continued)

*Primary Examiner*—Jacob F Bétit
(74) *Attorney, Agent, or Firm*—Fish & Richardson P.C.

(57) ABSTRACT

Methods and systems for efficient query rewriting and the like are described here. One such described method comprises: offline mapping frequently-seen search queries to rewritten queries that may be better for searching; offline caching the mapping in a cache memory; and upon receiving a search query from a user similar to one of the mapped search queries, obtaining a corresponding rewritten query from the mapping in the cache memory based on predetermined conditions, and issuing a search of the rewritten query to the backend data system in order to avoid having to issue a search query to the backend data system twice while the user is online.

26 Claims, 6 Drawing Sheets

U.S. PATENT DOCUMENTS

| | | |
|---|---|---|
| 2004/0122811 A1 | 6/2004 | Page .............................. 707/3 |
| 2004/0236736 A1* | 11/2004 | Whitman et al. ................ 707/3 |
| 2005/0198068 A1* | 9/2005 | Mukherjee et al. ........ 707/104.1 |
| 2005/0222975 A1* | 10/2005 | Nayak et al. .................... 707/3 |
| 2008/0126327 A1* | 5/2008 | Dettinger et al. ................ 707/4 |

* cited by examiner

METHODS AND SYSTEMS FOR EFFICIENT QUERY REWRITING

BACKGROUND OF THE INVENTION

1. Field of the Invention

The present invention relates generally to information retrieval. More specifically, embodiments of the present invention relate to methods and systems for efficient query rewriting.

2. Background

As known in the art, search sites such as Google™ and Yahoo!™ employ search engines to provide their users with information search and retrieval capabilities on the Internet. Typically, a search site would receive a search query from a user (hereinafter, "user query") and use its search engine to access its backend database or server system, which includes one or more index and document servers or databases, to conduct a search of the user query. Each document database/server maintains summarized text of documents the search site has located on the Internet. Each index database/server, as the name implies, maintains indices of the located documents and their summarized text in the document database/server.

Users of a search site often find it hard to enter or phrase a query that would be effective in finding relevant information on the Internet. Further, users often do not like to spend too much time and effort to formulate an effective query. Hence, a user query is typically ambiguous, and the hard work is left to the search site and its search engine to determine and retrieve the appropriate information requested by the user query. To improve the search process, some search engines use query expansion systems known in the field of information retrieval (IR) to modify user queries prior to conducting searches for the queries. In one typical implementation, a query expansion system of a search site performs a search of the site's backend data system for each user query twice: once to find documents that are potentially useful for the query from which it learns a more effective query (e.g., by adding new words in the query); and then again for the rewritten query to find the final set of documents to be presented to the user.

SUMMARY OF THE INVENTION

The aforementioned double searches for each user query can be time consuming and taxing to the machine resources of a search site. This is because for each user query, two queries are serially sent to the index and document server backends of the search site, potentially doubling the search latency and the total amount of work required by the backends. Thus, there exists a need for a method and system that can efficiently rewrite or modify a user query entered at a search site and effectively provide good search results.

Accordingly, exemplary embodiments of the present invention include a method and a computer-readable medium having encoded program code for: receiving a first search query having a first content; rewriting the first search query into a modified search query; mapping the first search query to the modified search query in a cache memory; receiving a second search query having a second content; determining whether a portion of the second content is substantially identical to the first content; responsive to the portion of the second content being substantially identical to the first content, substituting the modified search query for the portion of the second content to form a modified second search query; and issuing a search of the modified second search query having the substituted modified search query to a backend data system to return one or more search results as responsive to the received second search query.

The aforementioned embodiments are mentioned not to limit or define the invention, but to provide an example of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

The embodiments of the present invention are illustrated by way of example in, and not limited to, the following figures.

DETAILED DESCRIPTION OF THE INVENTION

Overview

Figure 1:
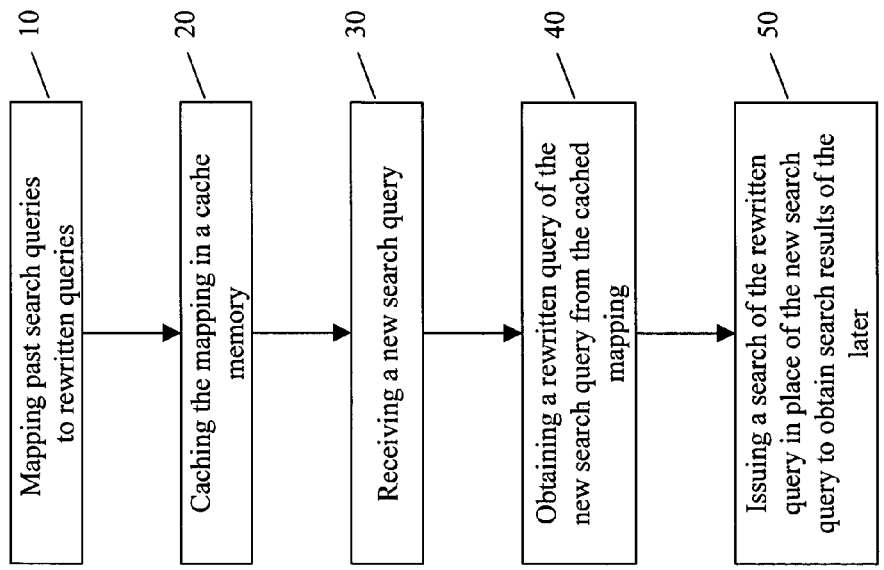
FIG. 1 depicts a high-level process flow of a method for efficient query rewriting in accordance with an exemplary embodiment of the present invention.

Embodiments of the present invention include methods and systems for efficient query rewriting of search queries. FIG. 1 depicts a high-level process flow of a method for efficient query rewriting in accordance with an exemplary embodiment of the present invention. At 10, as shown in FIG. 1, past search queries that were submitted to a search engine are mapped to rewritten queries, wherein each of the rewritten queries is based on a past search query, a component (e.g., a segment) of a past search query, or multiple components of a past search query in accordance to predetermined conditions. At 20, the mapping is cached in a cache memory maintained by the search engine. At 30, the search engine receives a new search query. At 40, a look-up of the mapping in the cache memory is performed to obtain a corresponding rewritten query for the new search query. At 50, the search engine issues a search of the rewritten query in place of the new search query to obtain search results for the later.

System Architecture

Figure 2:
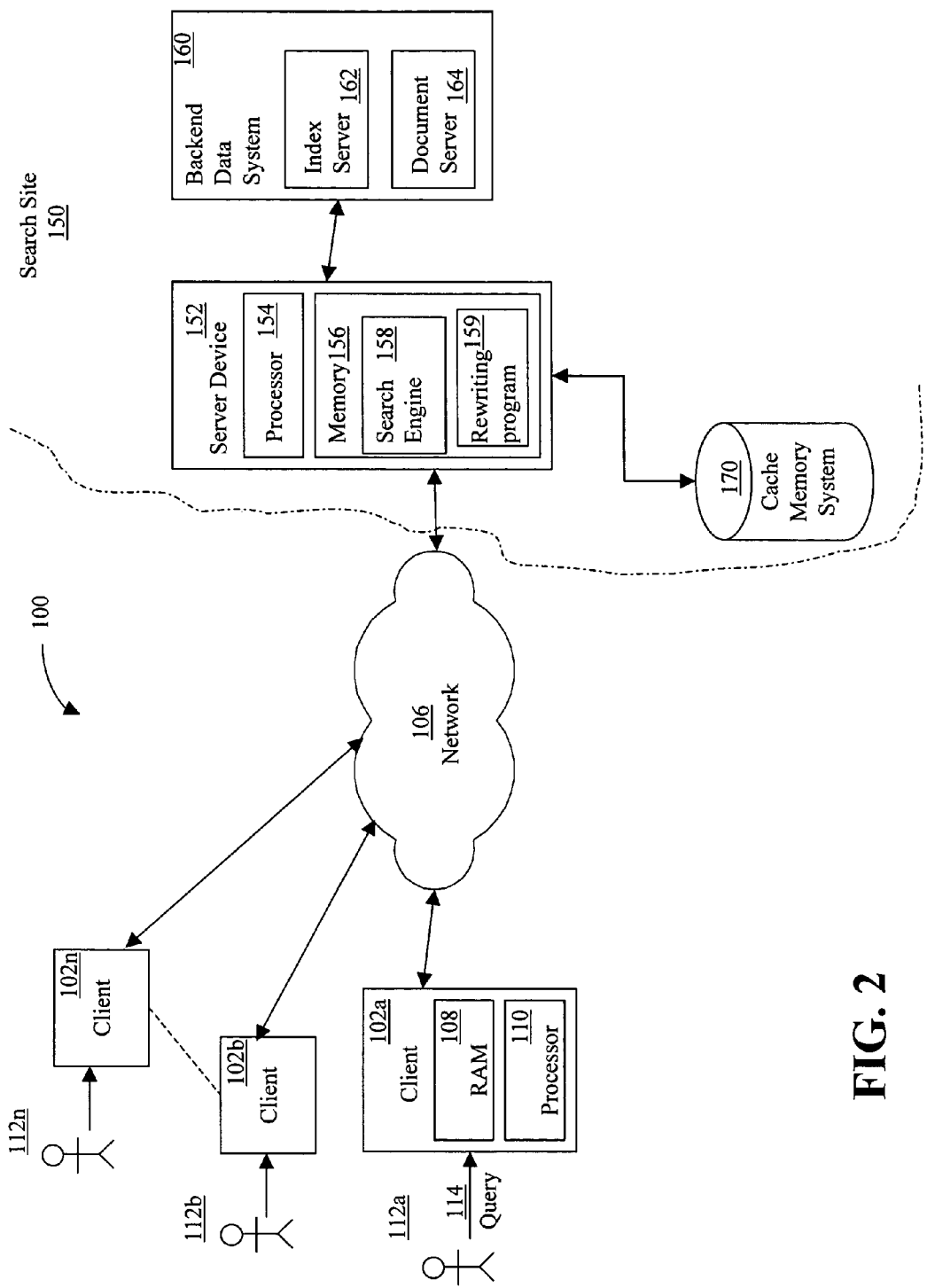
FIG. 2 depicts an exemplary environment in which an embodiment of the present invention may operate.

Reference is now made in detail to embodiments of the present invention, some examples of which are illustrated in the accompanying drawings, in which like numerals indicate like elements, showing a method and system for efficient query rewriting. FIG. 2 is a high-level diagram illustrating an exemplary environment for implementation of one embodiment of the present invention. The environment 100 shown in FIG. 2 includes multiple client devices 102a-n in communication with a search site 150 over a network 106. The network 106 can be a wired or wireless network. Further, it can be a public network, e.g., the Internet, or a private data network, e.g., a local area network (LAN) or a wide area network (WAN). Moreover, the client devices 102a-n can be in communication directly with the search site 150 without the use of the network 106.

Each of the client devices 102a-n includes a memory 108, which can be a computer-readable medium (CRM), such as a random access memory (RAM), coupled to a processor 110. The processor 110 executes computer-executable program instructions stored in the client device, such as memory 108, as program code. Such processors may include a microprocessor, an ASIC, and state machines. Such processors include, or may be in communication with, media, for example computer-readable media, which stores instructions that, when executed by the processor, cause the processor to perform the methods described herein. Client devices 102*a-n* can also include a number of external or internal devices such as a mouse, a CD-ROM drive, a DVD drive, a keyboard, a display, or other input or output devices. Examples of client devices 102*a-n* are personal computers, digital assistants, personal digital assistants (PDAs), cellular phones, mobile phones, smart phones, pagers, digital tablets, laptop computers, Internet appliances, and other processor-based devices. In general, the client devices 102*a-n* can be any type of processor-based platform that operates on any operating system capable of supporting one or more client application programs.

The search site 150 includes a server device 152 executing a search engine application program 158 (hereinafter, "search engine"), such as the Google™ search engine. Similar to the client devices 102*a-n*, the server device 152 includes a processor 154 coupled to a memory 156, which can be a CRM. Examples of a server device 150 are servers, mainframe computers, networked computers, a processor-based device, and similar types of systems and devices. The server processor 154 can be any of a number of computer processors, such as processors from Intel Corporation of Santa Clara, Calif. and Motorola Corporation of Schaumburg, Ill. In general, the server device 152 can be any type of processor-based platform that operates on any operating system capable of supporting one or more server application programs.

Embodiments of CRM for memories 108 and 156 include, but are not limited to, an electronic, optical, magnetic, or other storage or transmission device capable of providing a processor, such as the processor 110 of client 102*a*, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, switch, private or public network, or other transmission device or channel, both wired and wireless. The instructions may include code from any computer-programming language, including, for example, C, C++, C#, Visual Basic, Java, Python, Perl, and JavaScript.

The memory 156 contains the search engine 158, which searches for information from a backend data system 160 of the search site 150 in response to a search query from a user (i.e., user query) entered at, for example, a client device 102*a* and received by the search engine 158 through the network 106. In the embodiment shown, the backend data system 160 includes one or more index and document servers or databases (162 and 164). Although FIG. 2 shows that the backend data system 160 includes only one index server 162 and one document server 164, it should be understood that such system can include multiple of either or both servers, depending on the amount of data the search site 150 wishes to store and access for user queries.

In the embodiment shown, the server device 152, or a related device of the search site 150, has previously performed a crawl of a user-desired data network, such as network 106, to locate articles, such as web pages or documents, stored at other devices or systems connected to the network 106, or other desired network(s), and indexed and summarized the articles in the index server(s) 162 and document server(s) 164, respectively. The search site 150 further includes a cache memory system 170 which, in turn, includes a cache database or server with a memory such as a CRM for storing data.

As shown, the cache memory system 170 includes an online cache database/server that employs an offline caching scheme to create look-up tables mapping user queries to rewritten queries, as further detailed later, wherein the tables can be searched quickly online (hence, the cache memory system is an online cache server). As understood in the art and referred herein, an "online" system or method refers to a system or method that, for example, performs functions for a requesting user during the user's access to such system or method; whereas, an "offline" system or method refers to a system or method that performs functions for a requesting user before or after the user has terminated access to such system or method.

Figure 3:
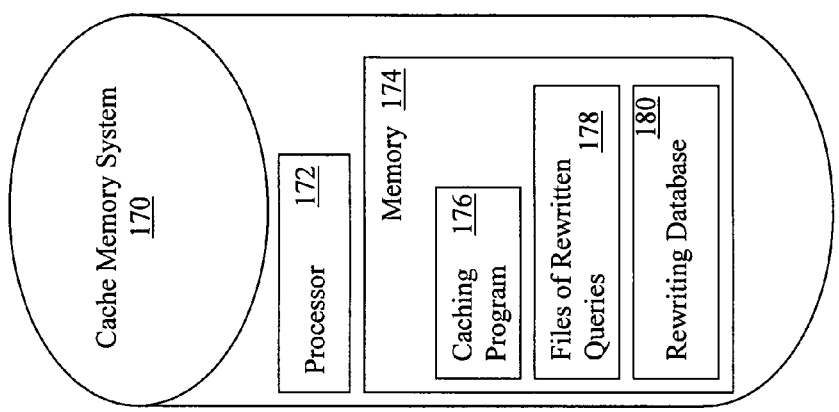
FIG. 3 depicts a cache memory system shown in FIG. 1 in accordance with an embodiment of the present invention.

Also in the embodiment shown, the online-cache database or server of cache memory system 170 is similar to the server device 152. In other words, as shown in FIG. 3, the cache memory system 170 includes a processor 172 and a memory 174. As with the server processor 154 in the server device 152, the processor 172 can be any of a number of computer processors, such as processors from Intel Corporation of Santa Clara, Calif. and Motorola Corporation of Schaumburg, Ill. Similarly, the memory 174 can be a CRM like the memory 156 in the server device 152, wherein files of rewritten frequent queries 178 can be stored. In general, the cache memory system 170 can be any type of processor-based platform that operates on any operating system capable of supporting one or more server application programs. In the embodiment shown, the cache memory system 170 executes a caching application program 176 to: 1) maintain a database 180 of rewriting information, based on input from the files of rewritten queries 178; and 2) generate look-up tables mapping user queries to rewritten queries based on the rewriting information. The rewriting database 180 contains a list of candidate user queries, each having a corresponding record that includes a rewritten query and other related information, such as the frequency of past appearances of the user query at the search site 150, a time stamp of database input of the rewritten query from the files of rewritten queries 178, and whether the rewritten query has been incorporated into a look-up table generated by the caching program 176 for online caching by the cache memory system 170.

Although FIG. 2 shows the rewriting program 159 being stored in the memory 156 of the server device 152, it should be understood that the rewriting program 159 can also be stored in the memory 174 of the cache memory system 170, or in any other memory area of the server device 152, cache memory system 170, or the search site 150 (e.g., an independent server maintained by the search site 150). Likewise, the caching program 176 can also be stored in memory 156 of the server device 152 or any other area of the server device 152 or cache memory system 170. Further, the aforementioned rewriting program 159 and caching program 176 can be different programs or a single program that includes instructions for both the rewriting and caching functionalities. The instructions for the rewriting and caching programs may include code from any computer programming language, including, for example, C, C++, C#, Visual Basic, Java, Python, Perl, and JavaScript, as mentioned earlier.

Figure 4:
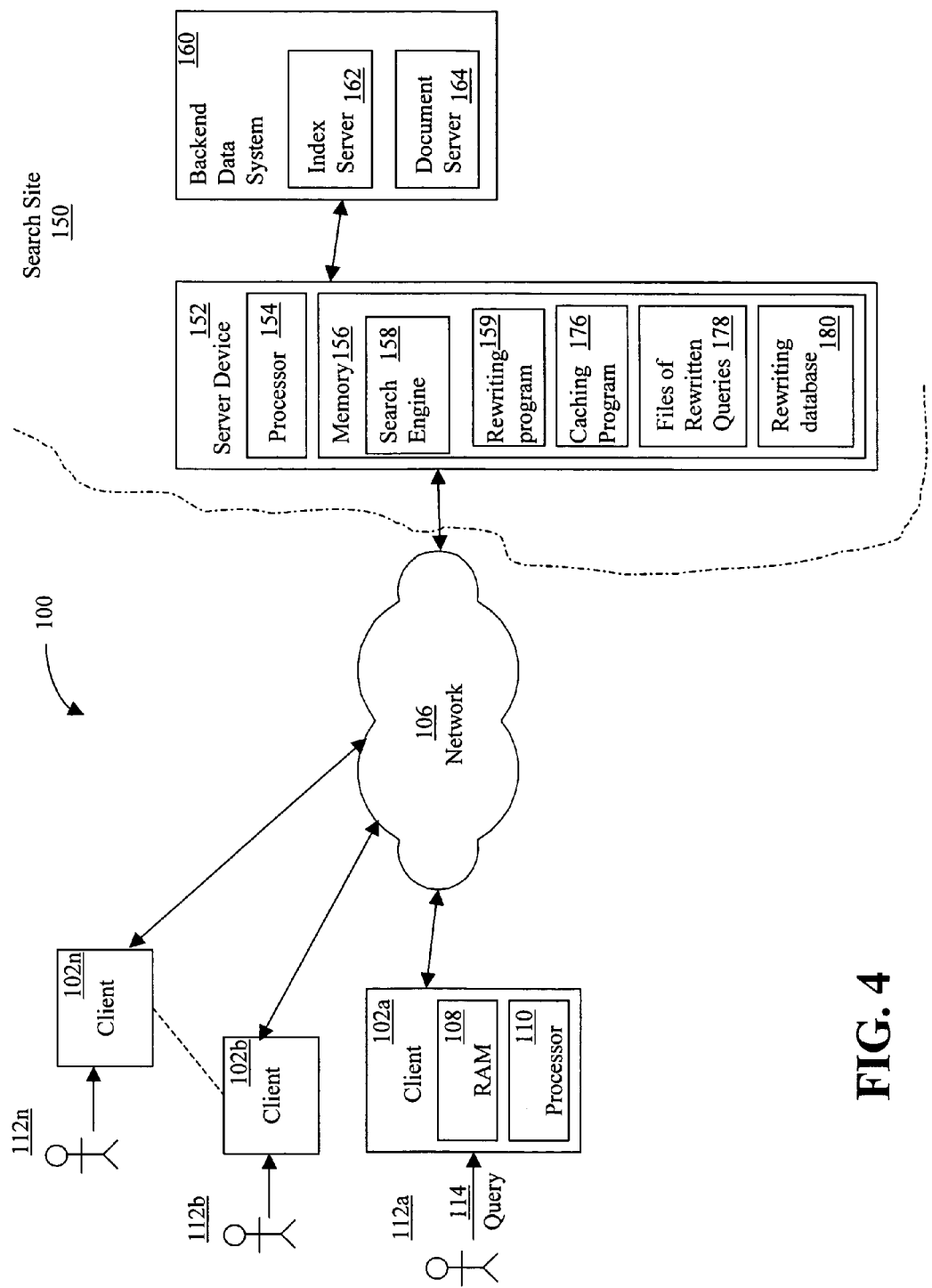
FIG. 4 depicts an exemplary environment in which another embodiment of the present invention may operate.

Although FIG. 2 shows that the cache memory system 170 is separate from the server device 152, such cache memory system can be incorporated into the server device 152 while retaining the same functionality as described above. Accordingly, FIG. 4 shows a high-level diagram illustrating an exemplary environment for implementation of another embodiment of the present invention, wherein a cache memory system is incorporated into the server device 152. In the embodiment shown in FIG. 4, a rewrite cache memory system is incorporated into the server device 152; particularly, the caching program 176, the files of rewritten queries 178, and the rewriting database 180 are incorporated into the memory 156 of the server device 152 (a separate processor for the rewrite cache scheme is not needed because the processor 154 can be used to process such scheme). Alternatively, the caching program 176, the files of rewritten queries 178, and the rewriting database 180 can be incorporated into another memory area of the server device 152 other than the memory 156.

Process

Figure 5A:
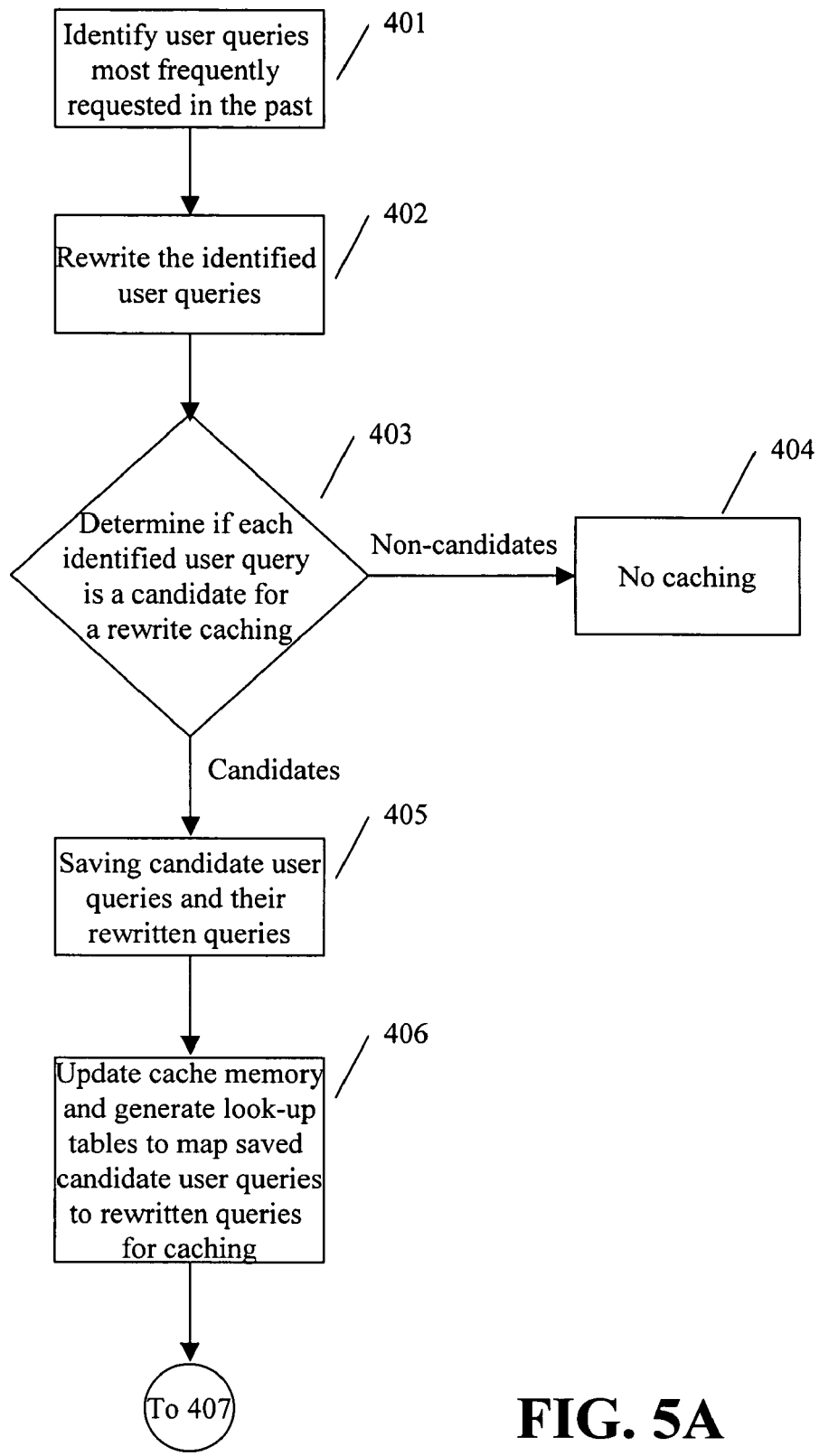
FIGS. 5A-B depict a process flow diagram for efficient query rewriting in accordance with an embodiment of the present invention.

According to the present invention, various methods for the cache memory system 170 may be implemented in the environment shown in FIG. 2 (and likewise in FIG. 4), as described next with reference to the process flow diagram shown in FIGS. 5A-B. Referring to FIG. 5A, at 401 the mapped user queries are taken from the most frequent user queries and/or the most frequent sub-queries (i.e., components) of the most frequent user queries the search site 150 had seen in the past. The search site 150 can perform this task manually or automatically. According to one embodiment of the present invention, the search site 150 executes an application program that reviews records of past search queries it received from users and identifies the most frequent user queries and/or the most frequent components therein based on desired criteria. For instance, how frequent a user query must be repeatedly entered at the search site 150 before being chosen for mapping and the time frame for such frequency can be criteria. In another instance, if the look-up process in the cache memory system 170 deals with query components, as described later, the offline query investigation can be further directed to identify and map the most popular query components in the most popular queries, and their rewrite results are stored in a way that can be used to rewrite longer queries that contain one or more identified popular components, as described later.

According to embodiments of the present invention, there are many kinds of query modification or rewriting that can be performed offline to generate rewritten queries for storage in the online cache server. In one kind of query modification, a more-common phrase substitution is performed. For example, an original user query for "bat man movie" is converted or modified to a more common or popular phrase "batman movie" as a rewritten query. In another example, an original user query "City of New York" is rewritten as a more common or popular phrase "New York City". In another kind of query modification, phrase augmentation is also performed, wherein related terms are added to a search query to expand the semantic scope of the search results (i.e., the set of documents potentially returned as search results). For example, an original user query for "batman movie" is converted or modified to "batman movie or robin movie" as a rewritten query.

In still another kind of query modification, the frequency and context with which terms occur in a set of resulting documents are used to rewrite frequent user queries. For this query modification, a user query frequently entered at the search site is first submitted to the site's backend data system to find a set of documents relating to the user query. The resulting document set is then semantically related through mapping of an ordered semantic list of pairs of {term, weight}, where weight indicates the degree to which a term is over-represented in the document set. The weight is based on recorded information about the particular contexts (e.g., parts of documents, neighboring terms, capitalization) in which each over-represented term appears and its frequency of appearance in the document set. Thus, when the document set is semantically coherent (i.e., related to a small set of common topics, and not a mixture of documents on many unrelated topics), the effect is to identify terms which are correlated with the common topics. The original user query is then modified by adding high-weight terms from the above semantic list as expansion terms. The degree at which a term is considered high-weight is set as desired by the search site. Also, the terms to be considered for expansion may be further restricted by grammatical or other considerations. Thus, the expansion terms can be restricted to those related by stems to existing terms in the original user query.

In still another kind of query modification, the expansion terms can be broader, in which case they can include synonyms and/or other concepts for query expansion that are known in the art.

It should be noted that the aforementioned query modifications are not meant to describe all possible query modifications, and other query modifications can be contemplated based on a reading of the present invention. Further, the different query modifications can be used separately or in any combination without deviating from the scope of the present invention.

Referring still to FIG. 5A, with reference to FIG. 1, at 402 the server device 152 next executes a rewriting application program 159 to perform one, all, or any combination of the aforementioned different query modifications for the identified user queries. At 403 the rewriting program 159 then determines whether each of the identified user query, and/or one or more sub-queries thereof, and their corresponding rewritten queries and/or sub-queries should be cached in the cache memory system 170. A user query (or sub-query therein) is a candidate for caching if there are reasons to believe that a modified query (or sub-query) can produce better search results. For instance, if the rewritten/modified query (or sub-query) provides identical search results as the original (typically the case for single-term queries because they are not modified), it will not be cached at 404. In the embodiment shown, when a rewritten query (or sub-query) differs from the corresponding original query (or sub-query therein), it will be cached along with the original user query (or sub-query therein). In another embodiment, an additional discriminating process involving machine learning can be used to compare the rewritten query to the original query and determine whether the rewritten version is preferred over the original for a search in the backend data system 160. For instance, on an experimental basis the search results for the original user query can be returned to one set of users, and the search results for the rewritten query can be returned to a second set of users and their responses (e.g., following links incorporated in the two search result sets) recorded. If the recorded responses to the two search results are comparable in behavior, then any difference in the responses can be taken to indicate difference in preference for one set over the other. Consequently, statistical support for this conjecture can be determined and used to improve the type of query rewrites presented through standard techniques known in the art.

At 405 the candidate user query and its rewritten query are saved in a file of rewritten queries located in the cache memory system 170 during updates as described later.

The search site 150 periodically performs analyses of past user queries that it received and information contained in the cache memory system 170 so as to update the system 170 as needed. Referring back to FIG. 5A, to update the system 170 with new candidate user queries, the rewriting program 159 is executed to rewrite the new candidate user queries in batch mode (i.e., for every new batch of frequent user queries) and store them in the files for rewritten queries 178 as shown in 405. At 406 the caching program 176 then inputs and organizes those files along with other aforementioned related information to update the rewritten database 180 and generate new look-up tables to map the new candidate user queries to rewritten queries as needed (i.e., whenever each candidate user query has not been mapped previously) for online caching by the cache memory system 170. The periodic update of the cache memory system 170 can be performed manually or automatically (with a predetermined or random period of time in between updates) to efficiently utilize the machine resources of the search site 150. For instance, the periodic update can be done in off-peak hours when user access to the search site 150 is at its lowest.

Figure 5B:
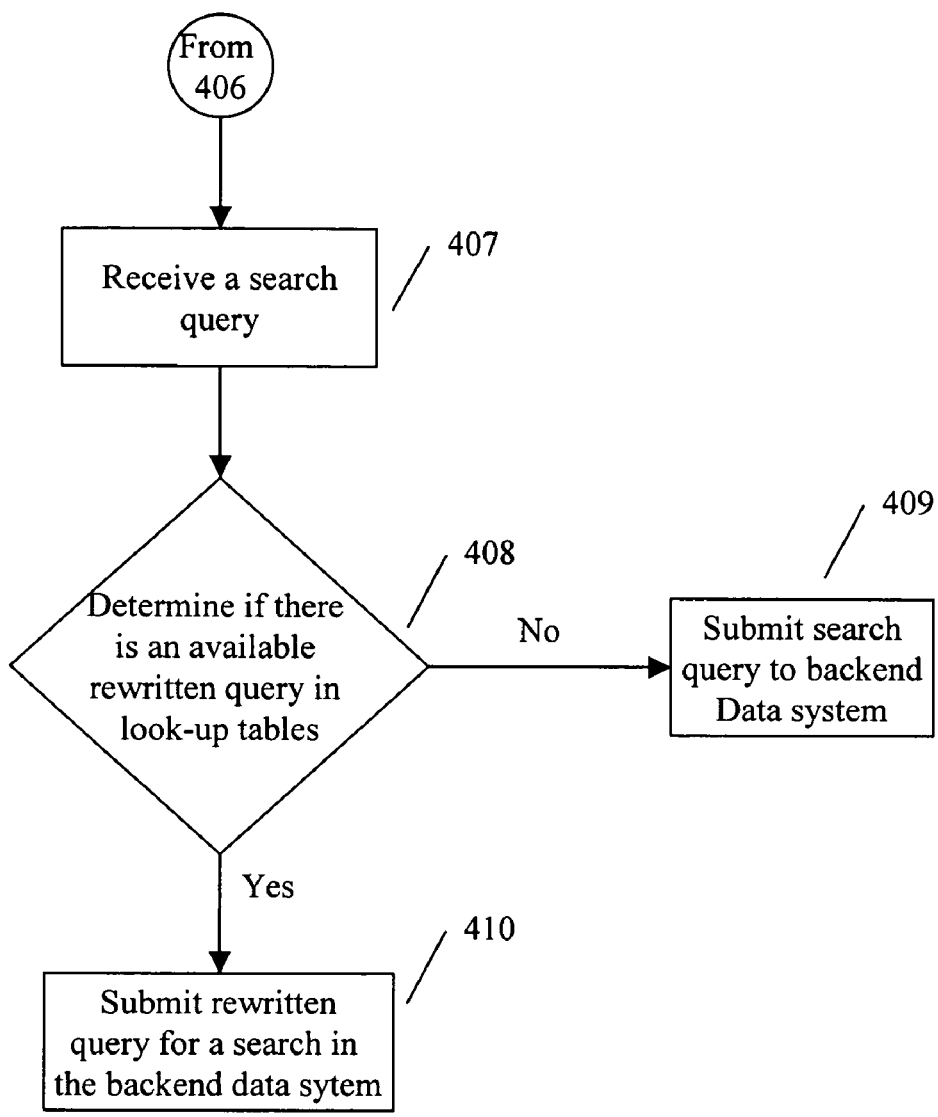

Referring now to FIG. 5B, in searching operations, at 407 the search site 150 receives a search query from a user at one of the client devices 112a-n via the network 106. At 408 the search engine 158 then sends the search query to the cache memory system 170 to determine whether a rewritten query is available for the particular search query. According to an embodiment of the present invention, the caching program 176 reads and writes to the database 180 and generates online cache maps for the user queries. Further, to extend the usefulness of the cache memory system 170, which may be limited in memory size, the caching program 176 can map not only user queries that are present in the rewriting database 180 as exact matches, but also user queries containing only components present in the rewriting database 180. For instance, when a user query of the form "A B C D" is entered at the search site 150, the caching program 176 will respond to a request from the search engine 158 for a query rewrite by first looking for an exact match of a modified query to such user query. If an exact match is found in the look-up tables in the cache memory system 170, the modified query is returned to the search engine 158, which then issues a search to the backend data system 160 for the modified query. If an exact match is not found, the caching program 176 will then search for increasingly small fragments of the user query (e.g., "A B C", "A B", then "A"; or "A C D", "A D", then "D"). If a fragment is found, such fragment in the user query will be modified according to the mapped-out rewritten term(s) for the fragment, and the modified user query will then be submitted to the backend data system 160. If multiple fragments are found, the query modification will be a resolution of the rewritten data found for all fragments (i.e., the mapped-out rewritten terms for all fragments).

Referring still to FIG. 5B, the cache memory system 170 will then return to the search engine 158 a corresponding rewritten query (or a resolution of rewritten sub-queries) from its look-up tables when available, or a message indicating that none is available. Where a rewritten query is available, at 410 the search engine 158 will substitute it for the original user query that it sends to the backend data system 160 (i.e., online caching is performed to provide a rewritten query without making any requests to the backend data system 160); otherwise, at 409 the search engine 158 will submit the input user query to the backend data system 160 for a search.

Example

An example of efficient query rewrite in accordance with an embodiment of the present invention is now provided with reference to FIG. 2. In this example, it is assumed that the search site 150 has gathered past popular (i.e., most frequent) search queries and/or past popular sub-queries seen in past search queries, mapped them with their respective rewritten queries and sub-queries, stored the mapping in the cache memory system 170 as described earlier. When a user, such as user 112a, accesses the search site 150 and submits a search query to the search engine 158, such search query is sent to the cache memory 170 to determine whether a rewritten query is available for the search query. In this example, suppose the user 112a submits a search query, "football coach training," and it is not found in the cache memory system 170. However, the caching program does map a sub-query, "football coach" to "football (coach OR coaches)" and a sub-query, "coach training" to "(coach OR coaching) (training OR trained)". As described earlier, the sub-queries "football coach" and "coach training" were mapped because such phrases appear frequently in past search queries to the search site 150. It should be noted that such past search queries do not need to be the most popular search queries, so long as the aforementioned sub-queries are frequently found in such search queries. The mapping and storing of the sub-queries are based on a query modification or a combination of query modifications as described earlier. As also described earlier, because multiple mapped sub-queries or fragments are found, the query modification is a resolution of the rewritten data found for all fragments. Thus, the rewritten or modified query to be submitted to the backend data system 160 for a search can be "football (coach OR coaches OR coaching) (training OR trained)" or "football coach (training or trained)", depending upon which resolution is preferred.

General

Although the invention has been described with reference to these embodiments, other embodiments could be made by those in the art to achieve the same or similar results. Variations and modifications of the present invention will be apparent to one skilled in the art based on this disclosure, and the present invention encompasses all such modifications and equivalents.

The invention claimed is:

1. A method comprising:
  populating a computer memory, by receiving a plurality of first search queries from a first plurality of computer users at a computer system, rewriting the plurality of first search queries into modified search queries, and mapping ones of the plurality of first search queries to corresponding modified search queries to produce a mapping in computer memory that correlates ones of the plurality of first search queries with corresponding ones of the rewritten search queries;
  wherein rewriting the plurality of first search queries into the modified search queries comprises:
    determining a phrase or term that is more common or popular than content of a first one of the plurality of first search queries; and
    rewriting the first one of the plurality of first search queries into a first one of the modified search queries such that the first one of the modified search queries includes the determined phrase or term in place of the content of the first one of the plurality of first search queries;
  providing search results for the rewritten search queries to the plurality of computer users;

subsequently processing a second search query received from a user who is different than the first plurality of computer users, by determining whether a portion of content from the second query matches a portion of content from at least one of the plurality of first search queries, and executing, based on a determination of whether a portion of the content from the second query matches a portion of content from at least one of the plurality of first search queries, (i) a computerized search using one of the rewritten queries that corresponds to the query from the plurality of first search queries that includes the matching portion of content in place of the second search query, or (ii) a search using information corresponding to the received second search query or a modified version of the second search query; and providing search results from processing the second search query to the second user.

2. The method of claim 1, wherein the memory comprises a look-up table for the mapping.

3. The method of claim 1, wherein the search of the one of the rewritten queries that corresponds to the query from the plurality of first search queries that includes the matching portion of content in place of the second search query is executed by a backend data system.

4. The method of claim 3, wherein the backend data system is physically apart from the memory and comprises one or more databases having data to be searched.

5. The method of claim 3, wherein the memory comprises a look-up table mapping the plurality of first search queries to the modified search queries; and
  wherein the backend data system is physically apart from the memory and comprises one or more databases having data to be searched.

6. The method of claim 1, wherein mapping is performed offline prior to receiving the second search query; and executing the search is performed online upon receiving the second search query.

7. A method comprising:
  populating a computer memory, by receiving a plurality of first search queries from a first plurality of computer users at a computer system, rewriting the plurality of first search queries into modified search queries, and mapping ones of the plurality of first search queries to corresponding modified search queries to produce a mapping in computer memory that correlates ones of the plurality of first search queries with corresponding ones of the rewritten search queries;
  wherein rewriting the plurality of first search queries into the modified search queries comprises:
    determining that a first one of the plurality of first search queries is frequently received;
    issuing the first one of the plurality of first search queries to the backend data system to find information related to the first one of the plurality of first search queries;
    determining additional content for the first one of the plurality of first search queries based on the related information; and
    rewriting the first one of the plurality of first search queries into a corresponding first one of the modified search queries such that the corresponding first one of the modified search queries includes the additional content;
  providing search results for the rewritten search queries to the plurality of computer users;
  subsequently processing a second search query received from a user who is different than the first plurality of computer users, by determining whether a portion of content from the second query matches a portion of content from at least one of the plurality of first search queries, and executing, based on a determination of whether a portion of the content from the second query matches a portion of content from at least one of the plurality of first search queries, (i) a computerized search using one of the rewritten queries that corresponds to the query from the plurality of first search queries that includes the matching portion of content in place of the second search query, or (ii) a search using information corresponding to the received second search query or a modified version of the second search query; and providing search results from processing the second search query to the second user.

8. The method of claim 1, wherein the plurality of first queries and the second search query are received at a first system of a search site, and the search of the modified search query is issued by a search engine in the first system.

9. The method of claim 8, wherein the first system of the search site comprises cache memory.

10. The method of claim 8, wherein the memory is physically apart from the first system of the search site.

11. The method of claim 8, wherein rewriting is performed by the first system of the search site.

12. The method of claim 11, wherein the steps of mapping and determining are performed by the first system of the search site.

13. The method of claim 11, wherein the memory is a database in a memory system of the search site, and the steps of mapping and determining are performed by the memory system.

14. The method of claim 8, wherein the memory is a database in a memory system of the search site, and rewriting is performed with the memory system.

15. The method of claim 14, wherein the steps of mapping and determining are performed by the memory system.

16. The method of claim 14, wherein the steps of mapping and determining are performed by the first system of the search site.

17. The method of claim 1, wherein the memory comprises a memory chip.

18. The method of claim 1, wherein the memory comprises a disk-storage memory device.

19. The method of claim 1, wherein rewriting the plurality of first search queries into the modified search queries further comprises:
  determining an additional phrase or term for content of a first one of the first plurality of search queries; and
  augmenting the first one of the plurality of first search queries to include the additional phrase or term.

20. A computer-readable storage device having computer-executable instructions contained therein for performing a method, the method comprising:
  populating a computer memory, by receiving a plurality of first search queries from a first plurality of computer users at a computer system, rewriting the plurality of first search queries into modified search queries, and mapping ones of the plurality of first search queries to corresponding modified search queries to produce a mapping in computer memory that correlates ones of the plurality of first search queries with corresponding ones of the rewritten search queries;

wherein rewriting the plurality of first search queries into the modified search queries comprises:

determining a phrase or term that is more common or popular than content of a first one of the plurality of first search queries; and rewriting the first one of the plurality of first search queries into a first one of the modified search queries such that the first one of the modified search queries includes the determined phrase or term in place of the content of the first one of the plurality of first search queries;

providing search results for the rewritten search queries to the plurality of computer users;

subsequently processing a second search query received from a user who is different than the first plurality of computer users, by determining whether a portion of content from the second query matches a portion of content from at least one of the plurality of first search queries, and executing, based on a determination of whether a portion of the content from the second query matches a portion of content from at least one of the plurality of first search queries, (i) a computerized search using one of the rewritten queries that corresponds to the query from the plurality of first search queries that includes the matching portion of content in place of the second search query, or (ii) a search using information corresponding to the received second search query or a modified version of the second search query; and providing search results from processing the second search query to the second user.

21. The computer-readable storage device of claim 20, wherein the method further comprises:

issuing a search of the received second search query to the backend search system in response to the portion of the content from the second query not matching any portion of content from the plurality of first search queries.

22. The computer-readable storage device of claim 20, wherein mapping the plurality of first search queries to the modified search queries in the memory comprises generating a look-up table for the mapping.

23. The computer-readable storage device of claim 20, wherein the mapping is configured to run offline prior to the step of receiving the second search query; and the issuing the search is configured to run online upon receiving the second search query.

24. A computer-readable storage device having computer-executable instructions contained therein for performing a method, the method comprising:

populating a computer memory, by receiving a plurality of first search queries from a first plurality of computer users at a computer system, rewriting the plurality of first search queries into modified search queries, and mapping ones of the plurality of first search queries to corresponding modified search queries to produce a mapping in computer memory that correlates ones of the plurality of first search queries with corresponding ones of the rewritten search queries;

wherein rewriting the plurality of first search queries into the modified search queries comprises:

determining that a first one of the plurality of first search queries is frequently received;

issuing the first one of the plurality of first search queries to the backend data system to find information related to the first one of the plurality of first search queries;

determining additional content for the first one of the plurality of first search queries based on the related information; and rewriting the first one of the plurality of first search queries into a corresponding first one of the modified search queries such that the corresponding first one of the modified search queries includes the additional content;

providing search results for the rewritten search queries to the plurality of computer users;

subsequently processing a second search query received from a user who is different than the first plurality of computer users, by determining whether a portion of content from the second query matches a portion of content from at least one of the plurality of first search queries, and executing, based on a determination of whether a portion of the content from the second query matches a portion of content from at least one of the plurality of first search queries, (i) a computerized search using one of the rewritten queries that corresponds to the query from the plurality of first search queries that includes the matching portion of content in place of the second search query, or (ii) a search using information corresponding to the received second search query or a modified version of the second search query; and providing search results from processing the second search query to the second user.

25. The computer-readable storage device of claim 20, wherein rewriting the plurality of first search queries into the modified search queries further comprises:

determining an additional phrase or term for content of a first one of the first plurality of search queries; and augmenting the first one of the plurality of first search queries to include the additional phrase or term.

26. A method comprising:

populating a computer memory, wherein populating the computer memory comprises:

receiving at a computer system search interface a plurality of instances of a first search query having a first plurality of search terms forming a phrase; determining an indicator of frequency with which the first search query has been received at the search interface;

when the first search query is determined, based on the indicator of frequency, to be among a group of most frequently received queries relative to other queries received at the search interface that are different than the first search query, rewriting the first search query, based on the phrase, into a modified search query having a second plurality of search terms that are different in content or order than the first plurality of search terms, and mapping, with the computer system, the first search query to the modified search query in the memory to produce a mapping stored in the memory that correlates the first search query to the modified search query; and subsequently processing a second search query including:

receiving the second search query;

determining that at least one portion of the second query matches one or more of the first plurality of search terms; and executing, based on the determination of whether at least one portion of the second query matches one or more of the first plurality of search terms, (i) a computerized search of the modified search query in place of the at least one portion of the second search query, or (ii) a search using information corresponding to the second search query or a modified version of the second search query, and returning one or more corresponding search results as responsive to the received second search query, wherein the at least one portion of the second query that matches the one or more of the first plurality of search terms is replaced by the modified search query.

\* \* \* \* \*